United States Patent [19]
Stover

[11] 3,899,671
[45] Aug. 12, 1975

[54] COMMUNICATION SYSTEMS
[76] Inventor: Harris A. Stover, 10306 Mountington Ct., Vienna, Va. 22180
[22] Filed: Feb. 27, 1974
[21] Appl. No.: 446,239

[52] U.S. Cl. .... 235/150.2; 235/150.24; 235/150.27; 325/117; 340/22; 340/32; 343/6.5 SS
[51] Int. Cl............... G08g 1/09; G06f 15/50
[58] Field of Search....... 235/150.24, 150.2, 150.27; 325/117; 340/22, 32; 444/1; 343/6.5 SS

[56] References Cited
UNITED STATES PATENTS
3,419,847  12/1968  Bonney .................... 340/22

OTHER PUBLICATIONS
Green, J., Electronics May Solve Area Road Sign Riddles, In the Evening Star, Washington, D.C. Nov. 6, 1969.
Programmed Driving Gets a Road Test in West Germany, In Electronics July 19, 1971, p. 125.
Electronic Car Control Nears, In Electronics February 7, 1958, p. 44.

*Primary Examiner*—B. Stephen Dildine, Jr.
*Attorney, Agent, or Firm*—Hill, Gross, Simpson, Van Santen, Steadman, Chiara & Simpson

[57] ABSTRACT

An automobile communication system which provides for transmitting stations located along highways and facilities located in vehicles such that the vehicle can receive information as to stop signs, whether the vehicle should turn left or right or proceed straight forward, distances to particular landmarks on the highway are given. Signal lights may be indicated in the vehicle as well as the speed of the vehicle. A driver instructed memory in the vehicle can be supplied with information indicating which particular highway the vehicle intends and desires to travel as well as other parameters.

11 Claims, 10 Drawing Figures

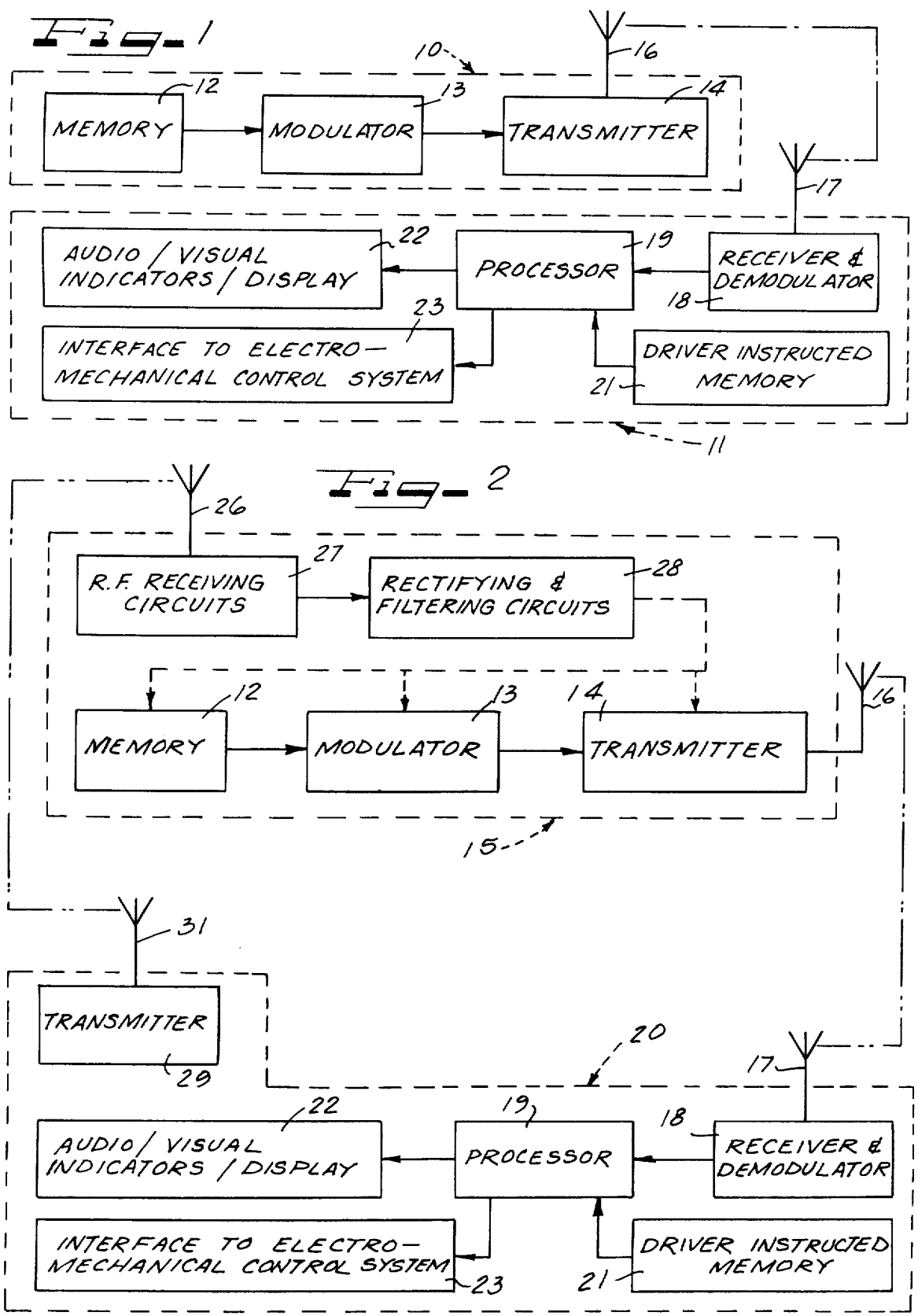

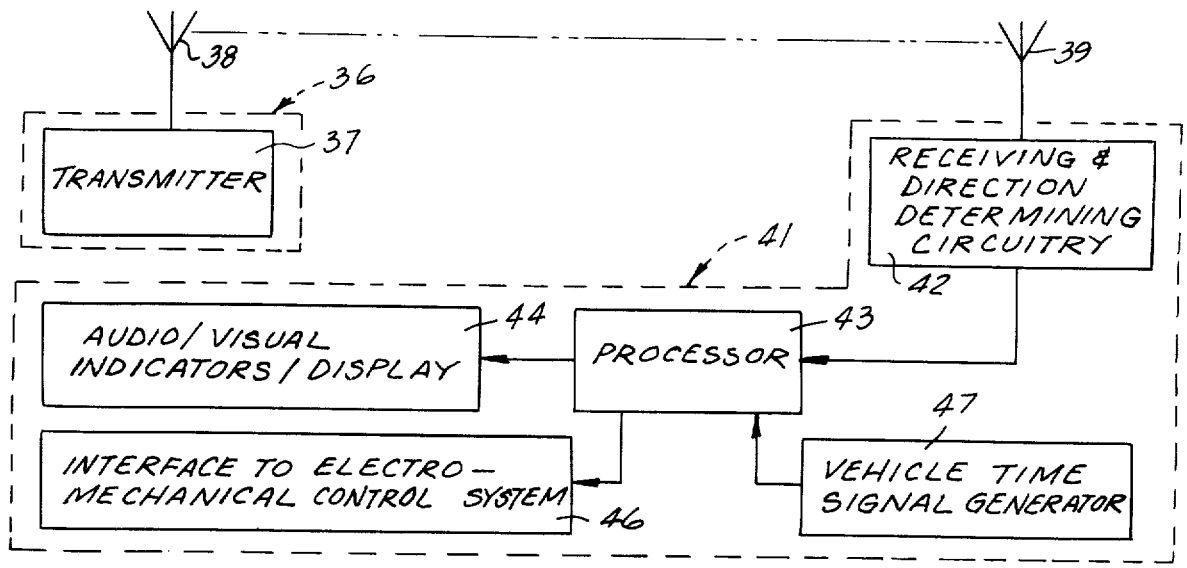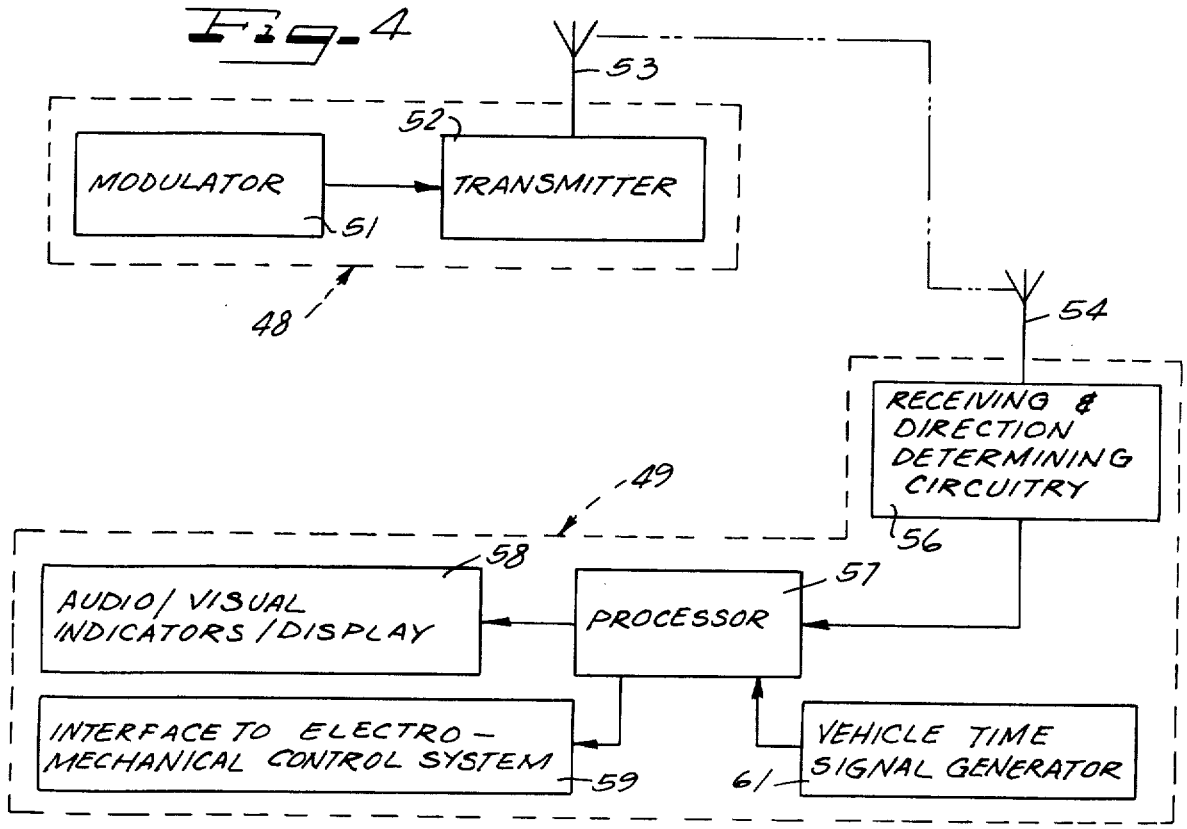

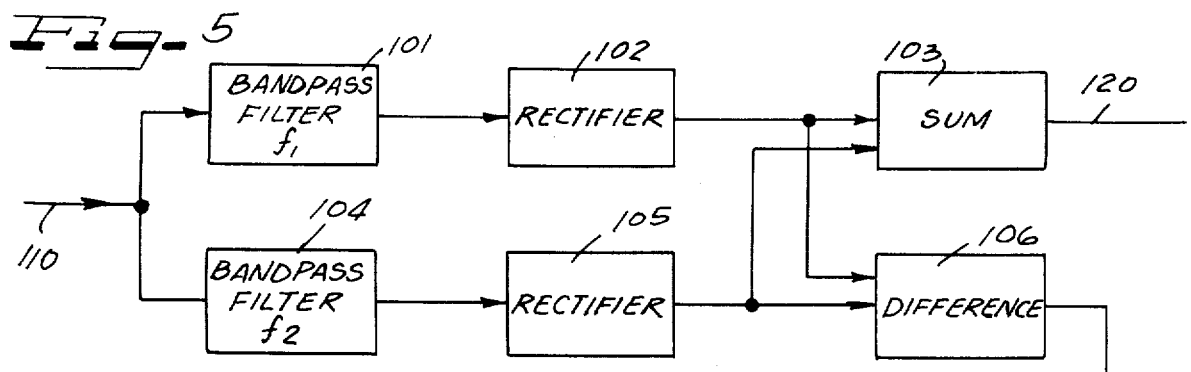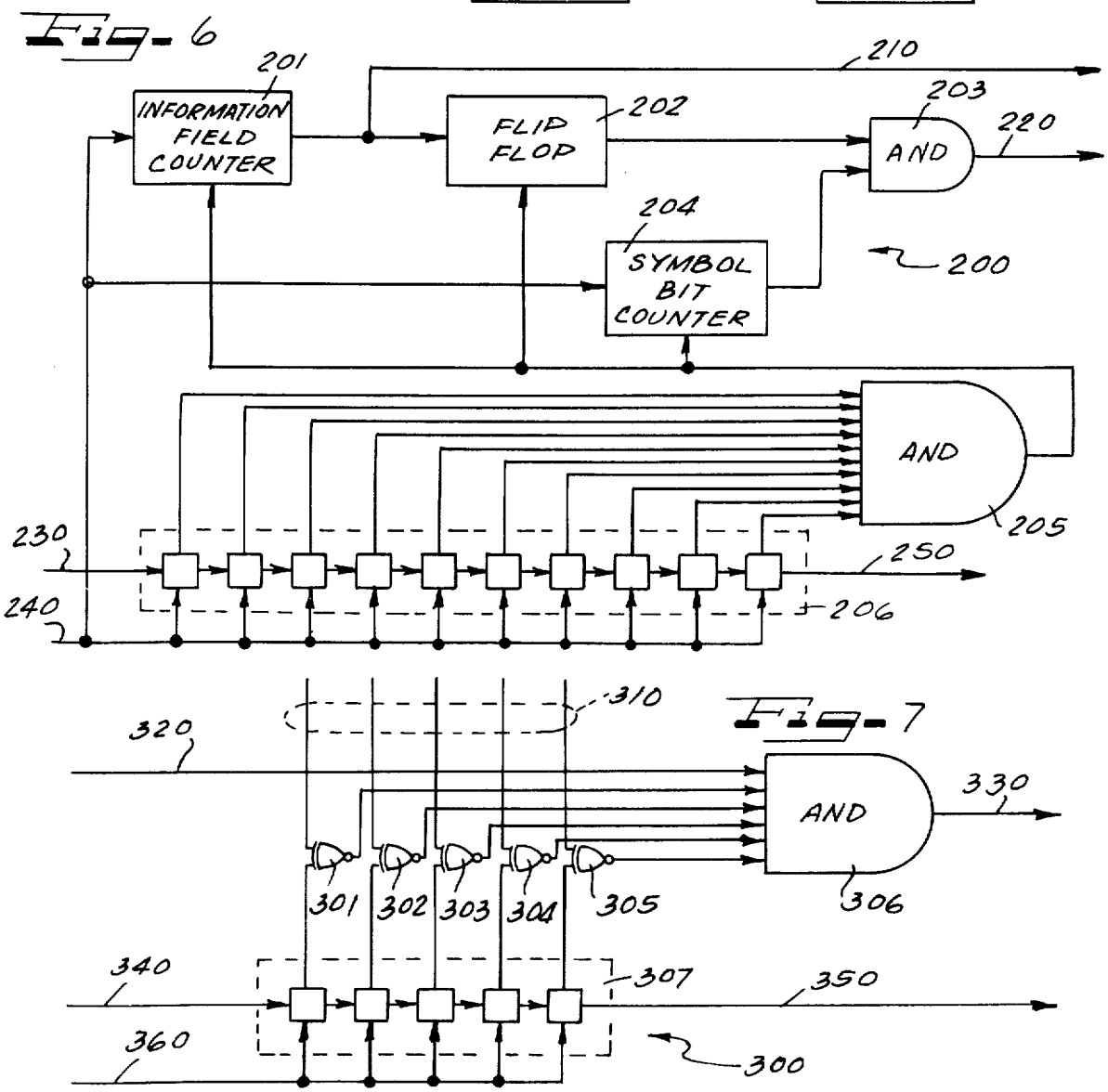

3,899,671

COMMUNICATION SYSTEMS

BACKGROUND OF THE INVENTION

Description of the Prior Art

The automobile is a primary method of transportation because it is convenient and efficient; however, it is involved in numerous accidents causing great human suffering and death. Many of the accidents are believed to result from fatigue and/or confusion of the driver such as is caused by operating the vehicle for long periods of time as well as fatigue which results from observing and sorting out numerous highway markers and indicators such that the particular indicators applicable to the particular vehicle are observed and can be followed. For example, as the driver travels down a major highway which may have a number of highways on it at that location, he must sort out the particular signs applicable to the highway which he is following so that he knows whether he turns at the next intersection or proceeds straight forward. In addition, the driver must watch for stop signs, color traffic lights, and signs such as "No left turn," "Right lane yield," "Right turn after stop on red," and "Stop for pedestrians in crosswalk." In addition to watching for all of these traffic signs, the driver must also watch for possible road hazards which exist on our highways as well as watching for conditions caused by other vehicles such as where a vehicle is parked or where an accident has occurred. In addition, signs which indicate the maximum speed for particular stretches of the highways, signs marking school zones, etc. must also be monitored and followed. These are some of the conditions which result in highway fatigue and/or confusion to the driver.

SUMMARY OF THE INVENTION

This invention eliminates or reduces many of these sources of fatigue and/or confusion by making highway travel safer, more convenient, comfortable, and pleasurable for the driver. The invention partly relieves the driver of the requirement to scan numerous roadway signs which apply only to highways other than the one which he is following and eliminates much of the clutter-type information that does not apply to him. It removes the requirement for him to actively select which information applies to him, and it provides him with more information that is of use to him and presents it to him in a more useful and convenient form. The information may also be provided to him in an electronic form that can be used if desired for the automatic or partially automatic control of the vehicle.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a block diagram of the invention.

FIG. 2 illustrates a modification of the invention.

FIG. 3 illustrates a further modification of the invention.

FIG. 4 is a block diagram of a further modification of the invention.

FIG. 5 is a block diagram of a data demodulator,

FIG. 6 is a block diagram of a synchronization unit.

FIG. 7 is a diagram of a coincidence detector,

DESCRIPTION OF THE PREFERRED EMBODIMENTS

Figure 8:
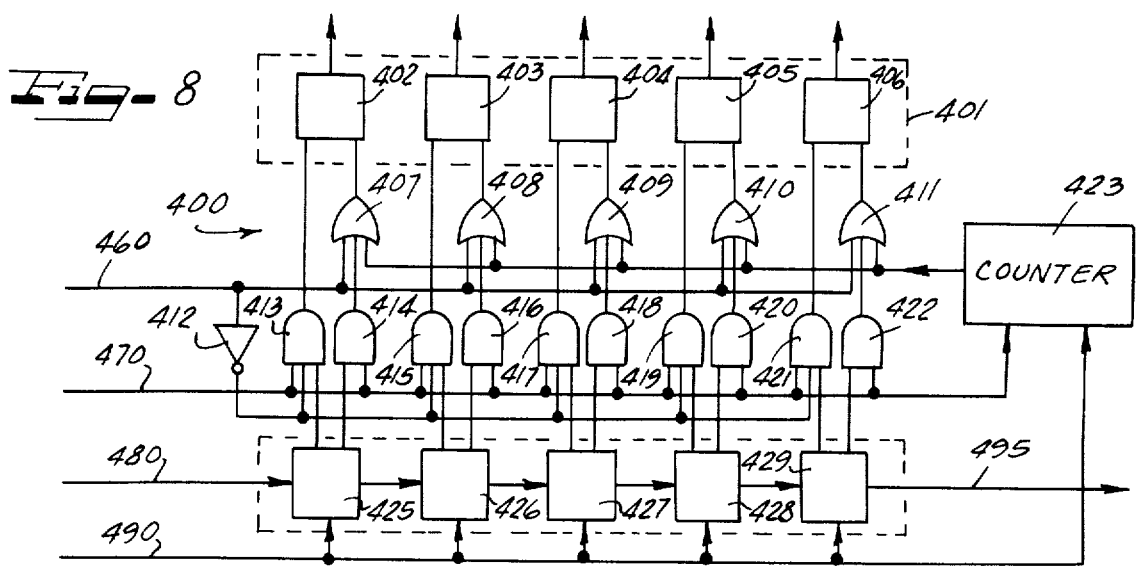
FIG. 8 is a diagram of a symbol transfer unit.

One form of the invention is illustrated in block form in FIG. 1 and comprises a transmitting station 10 which is located at strategic points along the highway for providing information to mobile-mounted receiving units 11 carried by vehicles. As the vehicle travels along the highway, the receiving unit 11 receives and selects certain of the information which is transmitted from the transmitting station 10 which is applicable to the particular vehicle in which the receiving unit 11 is mounted and presents it to the operator of the vehicle in an audio or visual manner. Alternatively or simultaneously, the operation of the vehicle may be automatic or semi-automatic, and the output of the receiving unit may be supplied to the automatic or semi-automatic control unit.

The transmitting station 10 comprises a transmitter 14 which has an antenna 16 and which receives an input from a modulator 13 which is modulated by the output of a memory 12. The transmitting unit 10, for example, might continually transmit intelligence based on the stored input from the memory 12 as to turns, stop signs, signal lights, and distance to landmarks along the highway. This information might be broken into separate groups associated with particular highways. For example, if there are three highways which are traveling a common section, the information applicable to all three of the highways might be given in either time frames or by using another suitable modulation separation and identification technique such as is well known to those skilled in the art.

The receiving unit 11 in the vehicle comprises an antenna 17 connected to a receiver and demodulator 18 which is turned to receive the output of the transmitter 14 and which supplies its output in a processor 19 which receives an input from a driver instructed memory 21. The processor 19 supplies output to audio/visual indicators/display 22 and/or to interface to electro mechanical control system 23 for automatic or semi-automatic control of the vehicle.

The driver instructed memory is set by the driver such that the processor 19 can separate the information applicable to the particular vehicle based on the highway desired to be traveled by the particular vehicle. This keys the processor 19 so only the desired information selected by the memory 21 will be passed to the units 22 and 23 for indicating display and control of the vehicle.

Address and data separation means of a type which could be adapted to control the processor 19 by the memory 21 such that the desired information is selected from the total received information and supplied to the units 22 and 23 are disclosed hereafter.

The processor 19 combines the received information from the transmitting system 10 with additional information supplied by the driver which is stored in the driver instructed memory 21 and combines and processes information into a form suitable for use by the audio/visual indicators/display 22 and the control 23.

As an example, the information transmitted by the transmitting system 10 may contain information relative to ten or more highways having different identification which share a common portion of the roadway. The transmitted information is correlated so as to identify its relevancy to each of the highways. For example, the transmitted information may indicate whether each of the particular highways turns right or left or goes straight ahead at the next intersection. It may also include information as to the distance to go to reach a particular landmark on each of the identified highways. The vehicle driver knows the identification of the particular highway which he wishes to follow and stores this identification in the driver instructed memory. When the information is received from the transmitting system 10 by the receiving station 11, the processor compares the received information with the stored information in the driver instructed memory 21 and passes only the information relevant to the selected highway through the units 22 and 23. The display unit 22 might, for example, display the number of the highway to which the unit is set so as to verify that the correct information is being received and presented.

The unit 22 might, for example, have a first display which comprises an arrow pointing straight up and which when illumined indicates that the driver is to go straight ahead at the next intersection. An arrow pointing to the left for a left turn indication and an arrow pointing to the right for a right turn indication may also be provided; and if either of these indications are illuminated, then the driver knows that he is to turn in the appropriate direction at the next intersection.

A numerical display of the miles to a particular landmark may also be presented by the unit 22.

The unit 22 may include an audio transducer which indicates to the driver what action should be taken. For example, a distinctive audio signal may indicate a left turn at the next intersection and a different audio signal may indicate a right turn and with a different signal indicating a straight ahead signal. In the example given, the driver supplies the memory 21 only with the identification information for a single highway. Since the vehicle will be traveling past many transmitters similar to transmitter 10 located at different locations, the memory 20 may be programmed so that it accepts information from the various transmitting stations for different highway numbers at different locations thus allowing the vehicle to follow different highways as it moves along. For example, suppose during the first 50 miles of the trip, highway 90 is to be followed. The driver instructed memory will supply the processor 19 with information which allows the information relevant to highway 90 to be received during the first 50 miles of travel. Suppose then highway 182 is to be travelled and the driver instructed memory may provide searching in the processor 19 for highway 182 such that when it is encountered the processor will switch to present the information from highway 182 after it has been intercepted.

It is to be realized that a number of sequential highway identification numbers or symbols can be provided to the driver by the memory 21.

The processor will continually compare all of the received highway identification information with the stored identification from the memory 21 and will accept information on the new highway when it is intercepted and will also change the indication on the display 22 to that of the newly intercepted highway. This system is an aid to the driver in use of road maps such that he knows at all times what highway he is travelling and also when he intercepts and switches to a newly selected highway.

Thus, the system described functions to sort out the information of the desired highway and isolates it from all the information relating to the other highways. This is very important because it relieves the driver of this tedious function and gives him the information in a standard audio/visual form in a much more efficient and usable manner than he can accomplish by the haphazard monitoring of visual highway marking signs along the highways.

In addition, information may be supplied which indicates stop signs which is displayed on the display 22 thus assuring that stop signs which are not conveniently placed for the driver to see them will not be missed. In addition, information indicating the condition of traffic lights can be transmitted by the transmitting unit 10 to the vehicle and presented by the unit 22 to the driver to indicate red-yellow-green. Often times, stop signs and traffic lights are either obscured or placed in different locations which are missed by drivers particularly where the driver is not use to the particular portion of the highway. Also, large trucks travelling the highway may obscure and block the driver's view of stop signs, as well as traffic lights, and other highway indication signs.

It is to be particularly noted that since the transmitting unit 10 gives information only at particular locations and for the immediate vicinity of the location, the radiated power can be very low thus assuring that power requirements will be inexpensive and minimal. For example, the transmitting station might be battery operated or alternatively can be operated from available power lines or even from power transmitted from the vehicle as will be described hereafter. The transmitting station may also be keyed by an interrogation signal from an approaching vehicle such that it does not need to continuously transmit information but merely transmits as vehicles are actually passing, thus, reducing the power required for operation. For example, during periods of the night between 2 and 6 A.M. perhaps only a few vehicles would be passing and the duty cycle of the transmitter would be correspondingly decreased.

The transmitter, modulator, and memory may be constructed so that they use very little power. If the memory unit 12 were a taperecorder playback unit or other electromechanical device, it would consume more power than the many economical solid state memory devices which are presently available for use. For example, complimentary MOS shift registers containing the stored information can be combined with a small clock oscillator to shift the information out of the shift register to the modulator 13 and form a suitable memory. Such shift registers may be constructed in a reentrant manner so that the same information may be recirculated through the shift register over and over again. Additional logic circuitry can be incorporated into the design so as to allow certain portions of the stored information to change in response to externally supplied signals, as for example, where the memory 12 is used to supply stop-go information on color traffic signal lights and the information must be periodically changed so as to provide a suitable correct indication.

The embodiment illustrated in FIG. 2 provides a transmitting station 10 which includes, in addition to the memory 12, the modulator 13 and the transmitter 14, an RF receiving circuit unit 27 and receiving antenna 26 which supplies an input to a rectifying and filter circuit 28 which supplies power to the memory 12, modulator 13, and transmitter 14. The vehicle includes a power transmitting transmitter 29 and radiating antenna 31 which radiates at the same frequency as the receiving circuit 27 so as to provide for the unit 15. The other units of the vehicle system are the same as those illustrated in FIG. 1. The transmitter 29 generates radio frequency power at the desired frequency and power level and radiates it through the antenna 31 to the surrounding space where it is picked up by the receiving antenna 26 and detected by the receiving circuits 27 and converted by the circuits 28 into usable form for the units 12, 13 and 14.

Thus, the system illustrated in FIG. 2 removes the requirement for supply of power lines or batteries at the fixed roadway station.

Although the systems described thus far are quite versatile, it is to be realized that additional information can be supplied to the driver or to the automatic control system of the vehicle in addition to the information stored in the memory. For example, by the use of directional antennas in either the vehicle or the roadway system, it is possible to determine within the vehicle whether the vehicle is travelling to the right or left of the desired path as determined by the location of the individual units of the fixed roadway transmission systems. For example, directional antennas in either the vehicle or the roadway systems can be utilized to allow the vehicle system to determine whether the vehicle is travelling to the right or left of the desired path as determined by the location of the individual roadway units. Electrical signals derived may be supplied to an audio/visual indicator/display to provide guidance information for the driver so that he can maintain his vehicle centered in the correct traffic lane. This information can also be supplied to a servo mechanism to automatically or semi-automatically guide the vehicle down the center of the traffic line. The directional antennas also allow the vehicle receiving system to accurately determine the instant at which the vehicle passes each individual unit of the roadway transmitting system and the roadway transmitting systems may be spaced such that the distance between them is proportional to the desired speed for each section of highway. The electrical signals derived by passing individual units of the roadway transmitting system may be compared with an electrical time signal generated in the vehicle system. This will provide a precise indication of whether the vehicle is travelling faster or slower than the desired speed. This information may be supplied to an indicator for use of the driver or may be supplied directly to a servo mechanism to maintain the vehicle at the desired speed.

An alternative method of speed control provides for spacing the individual units of the ground systems at equal distances and transmits from the memory 12 a desired ratio of the period of the time signals generated in the vehicle to the period of the vehicle passing times for individual units of the ground stations. Changes in speed for a given roadway may be accomplished by changing the information in the memory 12 rather than by changing the positions of the individual transmitting units.

Although specific examples of types of information and usages of the equipment have been given, it is to be realized that the available options and applications of the invention are very numerous. For example, information can be transmitted from the memory of the road system to the vehicle. This might be combined, for example, with a system for transmitting power from the vehicle to the roadway system. Another system could utilize the feature of providing guidance and speed information derived from the physical location of the roadway units. Another system might combine the guidance and speed information system with the system for transmitting power from the vehicle to the roadway system. A system which transmits this information from memory and supplies guidance and speed control information can also be utilized.

FIG. 3 illustrates in block form a system for providing guidance information and speed control information. The roadway systems comprises a simple transmitter 36 which includes a transmitter 37 connected to an antenna 38. The vehicle system 41 includes an antenna 39 and a receiving and direction circuitry 42 which are connected to the antenna 39. The directional antenna system 42 and the antenna 39 may utilize any of the well-known direction finding techniques to indicate whether the signal arriving at the directional antenna 39 is coming from in front or in back or is coming from the right or the left. The processor 43 receives the output of the receiving and direction determining circuitry 42 and places it in suitable form and supplies it to the audio/visual indicator/display 44 wherein the direction to the roadway transmitter is indicated. The processor 43 may also supply the electro-mechanical control system interface 46 for automatic control of the vehicle. Processor 43 also accepts information from the receiver and direction determining circuitry 42 which shows when the signal changes from the right or left and/or from arriving from front to rear. This indicates the moment of passing the transmitting system 36. This information is compared within the processor 46 with time signals generated by the vehicle carried time signal generator 47 to determine whether the vehicle is going too fast or too slow. This output may be indicated by the audio/visual indicator/display 44, and/or supplied to the interface to the electrical mechanical control system 46.

In the system of FIG. 3, the directional antenna system is carried on the vehicle so as to use radio direction finding techniques to determine the location of the receiving system relative to the transmitting system. This is normally the preferred system because it permits the transmission system 36 to be very simple.

FIG. 4 illustrates a modification wherein the directional antenna system is part of the transmitting system at the roadside rather than on the vehicle. In FIG. 4, the transmitting station fixed relative to the road is designated by 48 and comprises a transmitter 52 which is connected to an antenna 53. A modulator 51 supplies an input to the transmitter 52. The modulator 51 and directional antenna system 53 in combination produce a field in space with signal modification characteristics which are dependent upon the direction from the transmitting antenna.

The vehicle carries a receiving system 49 which includes an antenna 54 and receiving and direction determining circuitry 56 which receives the output of the antenna 54. A processor 57 receives the output of the circuit 56 and also receives an input from the vehicle time signal generator 61. The circuit 56 determines the relative direction of the receiving system 49 from the transmitting system 48 by evaluating the distinctive modulation of the received signal.

The processor 57 accepts the information from the receiver and direction determining circuit 56 and produces an output indicative as to whether the receiving system is to the right or left of the transmitting system 48 and supplies it in a suitable form to the audio/visual indicators/display 59 and/or to the interface to the electromechanical control system 59. The processor 57 also accepts information from the receiver and direction determining circuitry 56 which indicates when the receiving system 49 changes from being behind the transmitting system 48 and passes into and in front of it. This indicates the moment of passing the transmitting system 48. This information is compared within the processor 57 with time signals generated by the vehicle time signal generator 61 to determine whether the vehicle is going too fast or too slow. The processor 57 also generates this information into a suitable form for presentation by the audio/visual indicators/display devices 58. It is to be realized, of course, that there are many specific methods whereby the transmitting system 48 may produce a field in space having modulation characteristics that are dependent upon the direction from the transmitting antenna. There are many examples in the literature, one of which for example, in the common VOR and ILS systems used for aircraft.

Many different types of modulation common to digital transmission can be employed very effectively in this invention. The explanation will be made in terms of binary symbols although those skilled in the art will recognize that higher order symbols would also be very effective. Among the types of modulation that could be used in amplitude shift keying, phase shift keying and frequency shift keying as well as combinations and variations of these digital modulation techniques. One of the simplest to use that will be very effective in this application is frequency shift keying. In one application of the technique one frequency represents a mark (or one) and the other frequency represents a space (or zero). Each information bit is transmitted as a pulse of one frequency or the other representing either a mark or a space. By transmitting each bit as an individual pulse, bit timing requirements are satisfied along with the information transfer. Of course many other methods of providing the necessary bit timing are in common use. For purposes of the example assume that for each bit, actual transmission occurs for a fraction (perhaps half) of a bit period. Then in the data demodulator of FIG. 5, there will be a pulse from rectifier 102 following bandpass filter 101 for a mark, for example, and a pulse from rectifier 105 following bandpass filter 104 for a space. Since these two outputs are both fed to sum unit 103, sum unit 103 will have an output pulse for every bit whether the bit is a mark or a space. The difference unit 106 subtracts the output of rectifier 105 from the output of rectifier 102 so that a positive pulse occurs for a mark and a negative pulse for a space. Trigger circuit 107 is used to set flip flop 108 for positive pulses from difference circuit 106 and to reset flip flop 108 for negative pulses from difference circuit 106. Thus the data demodulator of FIG. 5 converts the input signal 110 to clock pulses at the output 120 and to mark/space data at the output 130.

The roadway transmitter's memory may be made up of two sections. One is a fixed memory section in which highway related information is stored while the other is an alterable memory section in which changing traffic control information is stored. The traffic control information is provided with a number of options any of which may be selected for readout. At intersections where there may be a traffic light, the selection of which option of the alterable portion of the transmitter memory is transmitted can be controlled by the traffic light. In locations where all vehicles may be expected to be equipped with the device described here, traffic signal lights will be unnecessary and their function can be performed entirely by this equipment. The transmitters, if properly interconnected, can provide the necessary timing and logic to generate all of the traffic control information to be presented to all vehicles approaching the intersection. Larger quantities of information can be made available more simply, more effectively and more economically than with present traffic control methods. This will become more evident when transmission formats and information displays have been discussed. Many options are available for applications in the alterable portion of the transmission memory. In one of the options, the information choices for the alterable portion of the memory are stored in a random access memory. Control signals select which of the choices will be transmitted.

Although there are many data formats that may be used for this signalling application, a particular one that seems to be simple, convenient and effective will be described. From the description of this format possible variants and similar alternate approaches which provide the same service will be evident to the reader. For this description it will be assumed that the binary data stream is broken into 5-bit symbols, although other numbers of bits per symbol could have been selected or the number of bits per symbol could be allowed to vary within the message. The explanation will be simplified by assuming all symbols are represented by five bits. Five bits can be used to represent 32 different symbols. The one consisting of all marks will be reserved for synchronization purposes. If two of these symbols each consisting of all marks are transmitted consecutively there will be no other combination of 5-bit symbols that can result in 10 consecutive marks. If this is preceeded by a symbol consisting of all spaces, this synchronization signal will be unique and cannot occur from any sequence of portions of symbols as they will occur in use. As will be observed later this will permit the synchronization equipment to be quite simple. The function of this unique synchronization signal at the receiver will be described with reference to FIG. 6. Two inputs are supplied to the Synchronization Unit (SU) of FIG. 6, the data input 230 and the clock input 240. The clock input 240 shifts the data through the shift register 206. Outputs from all stages of the shift register 206 are fed to AND circuit 205. When the 10-bit shift register 206 contains all marks, there will be an output from AND circuit 205 indicating the correct timing for information field synchronization.

In the example under consideration it is assumed that each symbol will be five bits long. The output of AND circuit 205 is used to reset symbol bit-counter 204. The 5-bit symbol bit-counter 204 provides an output pulse at every multiple of five bits following the field synchronization signal from AND circuit 205. The field synchronization signal from AND circuit 205 also resets flip flop 202 so that the output from flip flop 202 permits the output from symbol bit-counter 204 to pass through AND circuit 203 to provide a symbol sample pulse at output 220. The field synchronization signal from AND circuit 205 is also used to reset information field counter 201. If information field counter 201 should reach a count greater than the length of the information field, this indicates the loss of synchronization and there will be an output from information field counter 201 which is used as a display reset pulse and fed to output 210 so that it may be used to clear possibly erroneous information from the display. The output from information field counter 201 is also used to reset flip flop 202 so that the output of symbol bit-counter 204 cannot pass through AND circuit 203 and all data sampling will be inhibited until resynchronization is achieved. This function of the information field counter 201 is useful when initially acquiring a signal which may not be synchronized. It detects the out of synchronization condition, clears the display and inhibits further symbol sampling until synchronization is achieved. The three outputs from the Synchronization Unit (SU) 200 are the data output 250 from the shift register, the symbol sample pulse output 220 and the display reset pulse output 210.

The Symbol Coincidence Detector (SCD) of FIG. 7 is used to recognize particular 5-bit symbols. Its four inputs consist of a data input 340, a clock pulse input 360 which clocks the data into the 5-bit shift register 307, a symbol sample pulse input 320 and five bits from driver selected stored symbol memory 310. The output of the first stage of the shift register 307 is fed to a coincidence circuit 301. The coincidence circuit has an output that is the negative of a standard "exclusive or" circuit, i.e. the coincidence circuits 301, 302, 303, 304, and 305 have marks for their outputs if and only if both of their inputs are the same. Therefore there will be a mark output from coincidence circuit 301 if and only if the contents of stage 1 of shift register 307 is the same as the corresponding bit stored in memory 310. Similarly there will be mark outputs from coincidence detectors 302, 303, 304, and 305 if and only if the corresponding contents of their associated stages of shift register 307 match their corresponding bits in memory 310. The absence of a mark on symbol sample input 320 inhibits the symbol transfer pulse output 330 from AND circuit 306. If shift register 307 actually contains a single 5-bit symbol rather than portions of two adjacent symbols the Synchronization Unit (SU) will assure that there will be a mark on symbol sample pulse input 320. (This will be more evident later.) Therefore a symbol transfer pulse occurs at output 330 only if there is a 5-bit symbol in shift register 307 which exactly matches the five bits stored in symbol memory 310. The two outputs from the Syhmbol Coincidence Detector 300 are the data output 350 and the symbol transfer pulse output 330.

Figure 9:
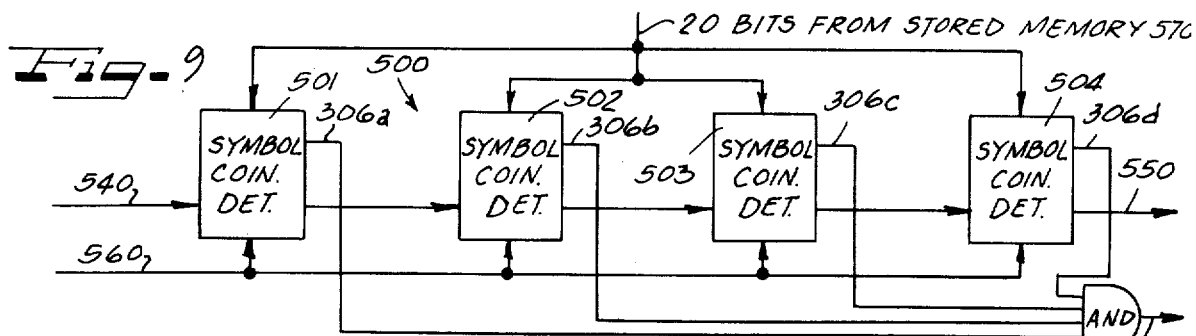
FIG. 9 is a diagram of a word detector.

Several of the Symbol Coincidence Detectors (SCD) of FIG. 7 may be connected in tandem to form a Word Detector (WD) 500 as illustrated in FIG. 9. The inputs to the Word Detector 500 include the data input 540 and the clock input 560 which shifts the data sequentially through the shift registers of the Symbol Coincidence Detectors 501, 502, 503, and 504. Additional input consists of the bits from stored memory 570 that are to be compared with the contents of the shift registers of the SCD's 501, 502, 503, and 504. The Symbol transfer pulse outputs 306A, 306B, 306C, and 306D of the SCDs in FIG. 9 are fed to AND circuit 506. If and only if there are symbol transfer pulses occurring simultaneously from all of the SCDs of the Word Detector (WD) there will be a transfer pulse out of AND circuit 506 which goes to the symbol transfer pulse output 530 from Word Detector (WD) 500. The outputs of Word Detector 500 consist of a data output 550 and a symbol transfer pulse output 530.

Figure 10:
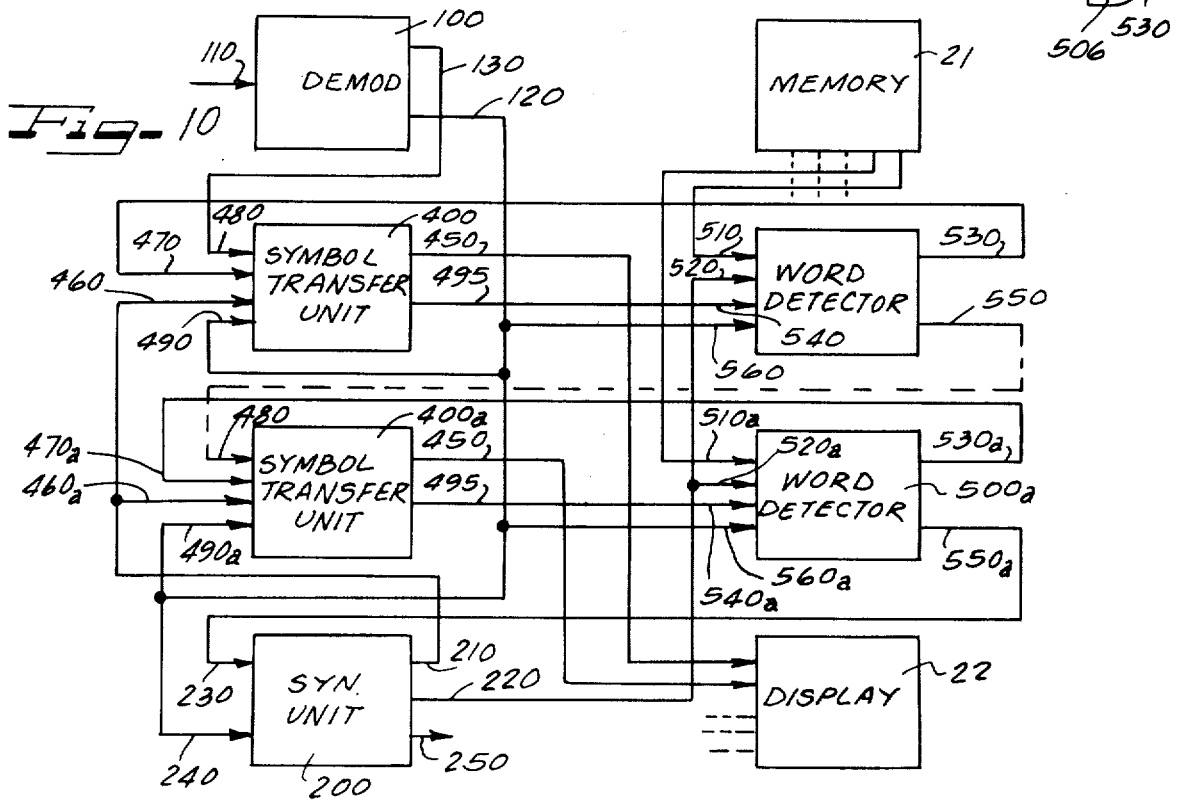
FIG. 10 is a diagram of a processor.

Two of the four inputs to the Symbol Transfer Unit (STU) shown in FIG. 8 are the data input 480 and the clock pulse input 490 which clocks the data into the shift register 424. The other two inputs to the STU are the symbol transfer pulse input 470 and the display reset pulse input 460. In use, one or more symbol transfer units will be connected in tandem with a Word Detector. When any SCD or STU contains a five bit symbol, all of them will contain five bit symbols. When the Word Detector recognizes a sequence of symbols identifying desired information as determined by information in the receivers stored memory, the Word Detector will generate a Symbol transfer pulse which will transfer the associated symbol or symbols thus identified to the display. This will become more clear later when FIG. 10 is discussed. In the symbol transfer unit (STU) of FIG. 8, if a display reset pulse is received on input 460 from the display reset pulse output 210 of the SU (FIG. 6) it will pass to OR circuits 407, 408, 409, 410, and 411 to reset all of the stages of output register 401. This clears the output register whenever improper synchronization should be detected. The display reset pulse input 460 is inverted by inverter 412 and supplied to AND circuits 413, 415, 417, 419, and 421 to inhibit any transfer of set pulses to the stages of output register 401 so long as the display reset pulse input 460 contains a mark. In the absence of a mark on the reset pulse display input 460, a symbol transfer pulse on signal transfer pulse input 470 will enable AND circuits 413, 414, 415, 416, 417, 418, 419, 420, 421, and 422 to transfer the contents of shift register 424 to output register 401. A Q state for stage 425 will set stage 402 while a Q̄ state for stage 425 will reset stage 402. Similarly, Q or Q̄ states for stage 426 will set or reset stage 403. In a corresponding manner stages 404, 405 and 406 of the output register 401 are set to agree with the corresponding stages 427, 428, and 429 of shift register 424. Therefore in the absence of a mark on display reset pulse input 460, a mark on the symbol transfer pulse input 470 will cause the contents of shift register 424 to be reproduced in output register 401. The output of symbol transfer unit (STU) 400 consists of 5 bits 450 to be supplied to the display.

Although in the more complex applications of this invention, it may be desirable to employ a programable computing unit to perform the desired processing functions, particularly where automatic control of the automobile is to be used, most general applications can be satisfied with the simpler logic units that have just been described.

FIG. 10 shows one example of how they could be interconnected to perform the required processor functions. In FIG. 10 the signal input 110 comes into the Data Demodulator (DM) 100. From the input signal 110 the DM derives a clock pulse 120 which is supplied as input to the Symbol Transfer Units (STU) 400 - - - 400A, to the Word Detectors (WD) 500 - - - 500A, and the Synchronization Unit (SU) 200. The dashed lines between the STU/WD pair 400/500 and the STU/WD pair 400A/500A in FIG. 10 is intended to indicate that any number of pairs may be provided in this sequential connection to accommodate as much driver supplied memory information as desired. In addition to deriving clock pulses from the incoming signal, the Data Demodulator (DM) 100 also recovers the data stream. The data is passed from output 120 of DM 100 to the input 480 of STU 400 then from the output 495 of STU 400 to the input 540 of WD 500 then from the output 550 of WD 500 to the input 480A of STU 400A then from the output 495A of STU 400A to the input 540A of WD 500A then from the output 550A of WD 500A to the input 230 of SU 200. Thus the data passes sequentially through the shift registers of the STU/WDD pairs in order and then through the shift register of the SU. As explained previously, signals from the SU assure the comparisons of the data in the WD with data stored in memory 21 is made only when complete symbol words are in each SCD of the WDs and that the display 22 is cleared if an out of synchronization condition is detected. If WD 500 of the WD/STU pair 400/500 detects a word which is stored in memory 21, it indicates that the information in the shift register of STU 400 at that particular moment is information in which the driver has interest. A symbol transfer pulse is generated and supplied to output 530 of WD 500 from where it is passed on to symbol transfer pulse input 470 of STU 400 which causes the information in the shift register of STU 400 to be transferred to the output register of STU 400 which is connected to the display output 450 of STU 400 which in turn causes the information to be displayed on display 22. As many different types of information as the driver may be interested in should have identification stored in memory 21 and for each of these types of information there should be an associated STU/WD pair. For example, if the driver is interested in information relative to a particular highway he is following, an STU/WD pair is required to identify that highway and separate it from the hundreds of others that he is not interested in so as to transfer only the desired information to the display. If he is interested in having information relative to the next highway he is expecting to follow to be presented to him as soon as that highway is intersected, he requires another STU/WD pair to identify it and transfer it to display. Similarly, if he is interested in two different types of traffic control information he needs two more STU/WD pairs to identify them. This will become more clear after discussing tables 1 through 7 which are used to describe particular data formats.

As has been previously mentioned, there are 32 5-bit symbols and for this example system 5-bit symbols are being used. When put into practice other numbers of bits per symbol could be selected. Table 1 indicates how the symbols could be assigned. As previously mentioned, two consecutive symbols consisting of all marks (symbol number 1 of Table 1) preceeded by a symbol of all spaces (symbol number 2 of Table 1) are used for synchronization purposes. This is illustrated in Table 2 as a symbol number 2 followed by symbol number 1 repeated twice. Highway information is selected by using a four digit highway number. As soon as four numerical digits representing a particular highway as shown in the first four symbol locations under highway information in Table 2 are recognized by the word detector, the information in the fifth symbol location under highway information in Table 2 will be transferred to the display. Table 3 gives a list of displays or meanings that could be assigned to these symbols for highway information. Since each of the different types of information can have its own display, the same symbol can have a different meaning for a different type of information. Table 4 gives displays or meanings that could be assigned for specific traffic lane information. Note that symbol number 16 for specific traffic lane information is a red stop light while for highway information in Table 3 it was an arrow pointing up. The four numerals designating a highway number indicated that the information was to go to the highway information display. As shown in Table 2 symbol 13 followed by symbols representing numerals indicating the particular lane will be associated with the display for that specific traffic lane. The WD/STU pair associated with highway information display will always have symbols representing four numerals stored in the memory for comparison by the WD. While the WD/STU pair associated with a specific traffic lane information display will have symbol 13 followed by symbols representing three numerals to indicate the particular lane stored in the reference memory for comparison by the WD. The same symbols shown in Table 4 may be used to apply to all traffic lanes simultaneously by having a display designated as an all lane display. This display could be selected by using symbol 13 repeated four times for the WD. Table 5 gives a possible selection of meanings that could be assigned to the symbols for Warning Sign Information. Table 2 indicates that warning sign information could be selected by repeating symbol 14 four times for the word detector (WD). Table 6 gives a possible selection of meanings that could be assigned to the symbols for Written Warnings. Table 2 indicates that written warning information could be selected by repeating symbol 14 three times followed by symbol 13 for the WD. Table 7 gives a possible selection of meanings that could be assigned to the symbols for Regulations. Table 2 indicates that regulation information could be selected by repeating symbol 14 twice followed by symbol 13 repeated twice for the WD. Table 2 shows that speed limit information could be selected by repeating symbol 15 four times. The WD for speed limit information would have two STUs associated with it in order to transfer two symbols each representing a decimal digit for the display.

As a specific example, a receiver processor might consist of a Data Demodulator followed by eleven Word Detector/Symbol Transfer Unit pairs followed by a Word Detector with two associated Symbol Transfer Units followed by a Synchronization Unit. The Data Demodulator and the Syncronization Unit perform their usual functions as described earlier. The first two WD/STU pairs are used for highway information and each is associated with a highway information display. The memories associated with these two WDs will each have four symbols selected from symbols 3 through 12 of Table 1 to represent four numerals indentifying the two highways. The first would be selected to designate the highway being traveled and the second the highway to be intersected. The next five WD/STU pairs are used for specific traffic lane information. The memories associated with these WDs will each have symbol 13 followed by three symbols selected from symbols selected from symbols 3 through 12 of Table 1 to represent three numerals identifying the particular traffic lane. A separate display can be provided for each lane. The next WD/STU pair will be associated with a display for information common to all traffic lanes. The memory associated with this WD will have symbol 13 repeated four times. The next WD/STU pair will be associated with a display for warning signs. The memory associated with this WD will have symbol 14 repeated four times. The next WD/STU pair will be associated with the display of traffic regulations. The memory associated with this WD will have symbol 14 repeated twice and symbol 13 repeated twice. The last WD with two STUs is used for speed limit information. The memory associated with the WD has symbol 15 repeated four times. When this word is detected by the WD the STUs transfer the two sumbols each selected from symbols 3 through 12 of Table 1 to represent a two digit speed limit which will be displayed.

Distance to a landmark could also be displayed in a manner similar to the way speed limit information is displayed.

At first thought the reader may think there are just as many symbols as he now has so that nothing has been gained. However, of all the different numbered highway signs, the system ignors all except two that he is actually interested in finding out about. The roadway transmitters will be transmitting highway information for all of the many highways sharing the particular roadway. This may be a very large number as evidenced by the density of highway identification signs along roadways at the present time. We do want all information that is useful to the driver to be available to him in a most convenient form. With this new system a particular type of information will always be available in the same place and the driver can form his habits accordingly. He will never have to search for the information as is now required. The information display can be very carefully arranged in the most useful way at the time the automobile is designed and will always remain consistant. It is simple to present all of the information simultaneously, i.e. every time any piece of information is presented all others could be repeated. At the present time speed limit information may only be presented once in fifteen or twenty miles in rural areas and once in a dozen blocks in urban areas. With the new system the speed limit information would be presented along with any stop signal, highway information, warning sign, regulation, etc. Needed information would be available when it was needed and since speed limit information would have its own display it wouldn't in any way interfere with other displays. The system may be arranged to provide a distinctive audible signal whenever the speed limit information changes. The same is true for any other information. For example, a little ding could be used when the speed limit changes, two dings could be used when the next highway is intersected, etc. A series of rapid chirps could indicate a stop. A series of slow chirps in the opposite direction could indicate a yield sign. A warble could indicate a warning sign, etc. This combination of eliminating unwanted information entirely, making desired information available more frequently in a well planned display, providing unique audible signals to attract attention to display changes and providing particularly distinctive audible signals to attract attention to particularly important traffic control devices such as stop signs, warning signs, etc. can greatly reduce driving fatigue, reduce confusion on the highways and save lives. When this is further coupled with other provisions described in this application which together permit complete automatic control of the automobile thereby removing human driver error even more lives will be saved.

The foregoing discussion should fairly well cover specific examples of the format of the information transfer and the relationship of this transfer to the electronic equipment. A few words may be said about displays. Numerical displays of many types are presently available commercially. Colored lights are also readily available so that there is no technology lacking for putting the information discussed here into effective displays. Flashers for providing flashing displays are also well known as are various types of electronic devices for producing distinctive audible signals.

At intersections where several transmitters for cars approaching from the different directions are quite close together and present different information it will be desirable to provide a degree of isolation among the signals that are received from the different transmitters. This may be accomplished by employing a frequency modulation subcarrier that uses a high deviation ratio in modulating the carrier. This type of signal will permit taking advantage of the capture effect of frequency modulation signals wherreby the stronger signal overrides the weaker signals. The subcarrier is then modulated with the desired data.

TABLE I

SYMBOLS USED IN DRIVER SELECTED MEMORY
AND FOR SYMBOL TRANSFER UNITS

| SYMBOL NUMBER | USED FOR |
|---|---|
| 1 | Unique synchronization symbol consisting of all marks (or ones) |
| 2 | Unique synchronization symbol consisting of all spaces (or zeros) |
| 3 | Numeral 1 |
| 4 | Numeral 2 |
| 5 | Numeral 3 |
| 6 | Numeral 4 |
| 7 | Numeral 5 |
| 8 | Numeral 6 |
| 9 | Numeral 7 |
| 10 | Numeral 8 |
| 11 | Numeral 9 |
| 12 | Numeral 0 |
| 13 | Unique symbol to identify particular types of information |
| 14 | Unique symbol to identify particular types of information |
| 15 | Unique symbol to identify particular types of information |
| 16 – 32 | Used for symbol display or other uses |

TABLE 2

WORD SYMBOL FORMATS

Information Field Synchronization

| 2 | 1 | 1 |
|---|---|---|

Highway Information

| 3–12 | 3–12 | 3–12 | 3–12 | 16–32 |
|---|---|---|---|---|

Specific Traffic Lane Information

| 13 | 3–12 | 3–12 | 3–12 | 16–32 |
|---|---|---|---|---|

Information For All Traffic Lanes

| 13 | 13 | 13 | 13 | 16–32 |
|---|---|---|---|---|

TABLE 2-Continued

WORD SYMBOL FORMATS

Warning Signs

| 14 | 14 | 14 | 14 | 16-32 |
|----|----|----|----|-------|

Written Warnings

| 14 | 14 | 14 | 13 | 16-32 |
|----|----|----|----|-------|

Regulations

| 14 | 14 | 13 | 13 | 16-32 |
|----|----|----|----|-------|

Speed Limits

| 15 | 15 | 15 | 15 | 3-12 | 3-12 |
|----|----|----|----|------|------|

TABLE 3

DISPLAY SYMBOLS FOR HIGHWAY INFORMATION

| SYMBOL NUMBER | HIGHWAY INFORMATION |
|---|---|
| 1-15 | Same as Table 1 |
| 16 | Arrow pointing up (straight ahead) |
| 17 | Arrow pointing right (turn right) |
| 18 | Arrow pointing left (turn left) |
| 19 | Left hand vertical bar illuminated (use left lane) |
| 20 | Center vertical bar illuminated (use center lane) |
| 21 | Right hand vertical bar illuminated (use right lane) |
| 22 | Detour ahead |
| 23 | Intersection with another highway ahead |
| 23-32 | — |

TABLE 4

DISPLAY SYMBOLS FOR SPECIFIC TRAFFIC LANE INFORMATION

| SYMBOL NUMBER | SPECIFIC TRAFFIC LANE INFORMATION |
|---|---|
| 1-15 | Same as Table 1 |
| 16 | Red light (stop) |
| 17 | Flashing red light (stop—proceed when safe) |
| 18 | Amber light (change about to be made) |
| 19 | Flashing amber light (slow—proceed with caution) |
| 20 | Flashing amber arrow to right (caution for right turn—yield to vehicle entering intersection) |
| 21 | Flashing amber arrow to left (caution for left turn—yield to vehicle entering intersection) |
| 23 | Flashing amber arrow pointing up (caution for straight ahead—yield to vehicle entering intersection) |
| 24 | Green arrow to right (right turn) |
| 25 | Green arrow to left (left turn) |
| 26 | Green arrow pointing up (proceed straight ahead) |
| 27 | Yield |

TABLE 5

DISPLAY SYMBOLS FOR WARNING SIGNS

| SYMBOL NUMBER | WARNING SIGN |
|---|---|
| 1-15 | Same as Table 1 |
| 16 | Sharp right turn |
| 17 | Sharp left turn |
| 18 | Curve to right |
| 19 | Curve to left |
| 20 | Winding road |

TABLE 5-Continued

DISPLAY SYMBOLS FOR WARNING SIGNS

| SYMBOL NUMBER | WARNING SIGN |
|---|---|
| 21 | Cross road |
| 22 | Road intersection from right |
| 23 | Road intersection from left |
| 24 | Y intersection |
| 25 | T intersection |
| 26 | Branch road to right |
| 27 | Branch road to left |
| 28 | Hill |
| 29 | Bump |
| 30 | Railroad crossing |
| 31 | Merge |

TABLE 6

DISPLAY SYMBOLS FOR WRITTEN WARNINGS

| SYMBOL NUMBER | WRITTEN WARNINGS |
|---|---|
| 1-15 | Same as Table 1 |
| 16 | Dead end |
| 17 | Stop ahead |
| 18 | Low clearance |
| 19 | Pedestrians |
| 20 | Cattle crossing |
| 21 | Men working |
| 22 | Soft shoulders |
| 23 | Slippery when wet |
| 24 | Hospital zone |
| 25 | School zone |
| 26 | Trucks entering |
| 27 | Dip |
| 28 | Hill |

TABLE 7

DISPLAY SYMBOLS FOR REGULATIONS

| SYMBOL NUMBER | REGULATION |
|---|---|
| 1-15 | Same as Table 1 |
| 16 | No turns |
| 17 | No U turn |
| 18 | No right turn |
| 19 | No left turn |
| 20 | No trucks |
| 21 | Trucks use right lane |
| 22 | No passing |
| 23 | No passing on right |
| 24 | No passing on left |
| 25 | Stay in lane |

It is seen that this invention provides new and novel systems and apparatus for increasing the safety and comfort of opeerators of vehicles. Although it has been described with respect to preferred embodiments, it is not to be so limited as changes and modifications may be made therein which are within the full intended scope as defined by the appended claims.

I claim as my invention:

1. A ground vehicle system comprising, a plurality of fixed transmitters installed at different locations along a highway, modulator means connected to each of said fixed transmitters, memory means connected to each of said modulator means to supply highway intelligence, a receiver mounted on a vehicle and tuned to receive information from said fixed transmitters, a data processor connected to said receiver, a vehicle memory connected to said data processor, utilization means connected to said data processor to utilize selected information transmitted by said fixed transmitters, and wherein said vehicle memory selects information from the received information relevant to stop signs.

2. A ground vehicle system according to claim 1 wherein said vehicle memory selects information from the received information relevant to one of a plurality of highways.

3. A ground vehicle system according to claim 1 wherein said vehicle memory selects information from the received information relevant to direction of one of a plurality of highways at an intersection.

4. A ground vehicle system according to claim 1 wherein said utilization means includes an automatic control system for said vehicle.

5. A ground vehicle system according to claim 1 wherein said vehicle memory selects information from the received information relevant to signal lights.

6. A ground vehicle system according to claim 1 wherein said vehicle memory selects information from the received information relevant to distance to go to a reference location.

7. A ground vehicle system according to claim 1 wherein said utilization means includes visual indicators.

8. A ground vehicle system according to claim 1 wherein said utilization means includes audible indicators.

9. A ground vehicle system comprising, a plurality of fixed transmitters installed at different locations along a highway, modulator means connected to each of said fixed transmitters, memory means connected to each of said modulator means to supply highway intelligence, a receiver mounted on a vehicle and tuned to receive information from said fixed transmitters, a data processor connected to said receiver, a vehicle memory connected to said data processor, utilization means connected to said data processor to utilize selected information transmitted by said fixed transmitters, and wherein said vehicle system includes direction determining circuitry so that the bearing between the vehicle and one of said fixed transmitters can be determined.

10. A ground vehicle system according to claim 9 wherein said vehicle system includes a time base generator connected to said processor to allow the velocity of the vehicle to be calculated.

11. A ground vehicle system comprising, a plurality of fixed transmitters installed at different locations along a highway, modulator means connected to each of said fixed transmitters, memory means connected to each of said modulator means to supply highway intelligence, a receiver mounted on a vehicle and tuned to receive information from said fixed transmitters, a data processor connected to said receiver, a vehicle memory connected to said data processor, utilization means connected to said data processor to utilize selected information transmitted by said fixed transmitters, and wherein said vehicle includes a power transmitter and said fixed transmitters include a power receiver tuned to said power transmitter for driving said fixed transmitter.

* * * * *

UNITED STATES PATENT OFFICE
CERTIFICATE OF CORRECTION

PATENT NO. : 3,899,671
DATED : August 12, 1975
INVENTOR(S) : Harris A. Stover

It is certified that error appears in the above-identified patent and that said Letters Patent are hereby corrected as shown below:

Column 2, line 40, the word "turned" should be --tuned--.
In the following line, the word "to" should read --in--.

Column 5, line 8, the word "power" should be inserted after "provide".

Column 7, line 29, the word "in" should be --is--.

Column 7, line 37, the word "in" should be --are--.

Column 9, line 57, the word "Syhmbol" should be "Symbol"

Column 11, line 16, "STU/WDD" should be "STU/WD"

Column 14, line 27, "wherreby" should be --whereby--.

Column 16, line 54, "opeerators" should be --operators--.

Signed and Sealed this second Day of December 1975

[SEAL]

Attest:

RUTH C. MASON
Attesting Officer

C. MARSHALL DANN
Commissioner of Patents and Trademarks